Sept. 29, 1970   J. A. PEASLEY   3,531,142
TANK FITTING
Filed Aug. 5, 1968
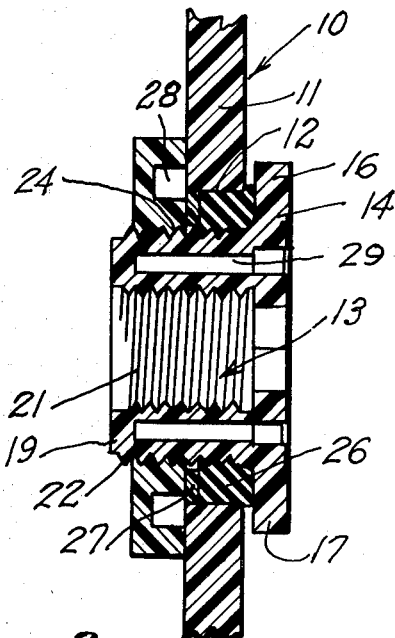
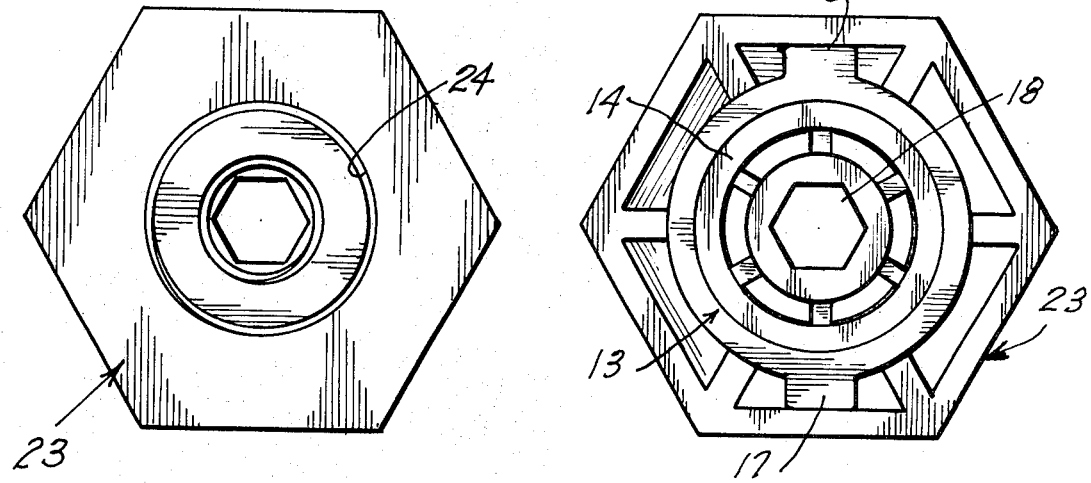
INVENTOR.
John A. Peasley
BY Hill, Sherman, Meroni, Gross, Simpson ATTORNEYS

United States Patent Office 3,531,142
Patented Sept. 29, 1970

3,531,142
TANK FITTING
John A. Peasley, Sioux Falls, S. Dak., assignor to Raven Industries, Inc., Sioux Falls, S. Dak., a corporation of South Dakota
Filed Aug. 5, 1968, Ser. No. 750,060
Int. Cl. F16l 35/00
U.S. Cl. 285—39          2 Claims

ABSTRACT OF THE DISCLOSURE

A tank fitting having a hollow bolt which receives a left-hand threaded nut and between which is mounted a flexible washer so as to provide a seal in an opening of a tank. The left-hand thread provides tightening of the fitting when a right-hand threaded pipe is screwed into the internal opening of the bolt.

BACKGROUND OF THE INVENTION

Field of the invention

This invention relates in general to fluid fittings and in particular to a self-tightening fluid seal formed with bolt and nut members.

Description of the prior art

Prior fluid seal fittings have had nuts with right-hand threads and these have a tendency to loosen when a right-hand threaded pipe is screwed into an internal opening in the bolt of the fitting. Also prior art fluid seal fittings have had a tendency to deteriorate and leak as the flexible grommet of the fitting becomes old and deteriorates.

SUMMARY OF THE INVENTION

The present invention comprises a fluid seal fitting for attaching a pipe to a tank wall and comprises a bolt structure formed with internal threads for receiving the pipe therein and formed with left-hand external threads for receiving a left-hand threaded nut. A flexible grommet is mounted in the opening through the wall of the tank and is compressed by tightening the left-handed threaded nut on the bolt so as to cause the flexible grommet to flow and make a fluid tight seal.

Due to the left-handed threads on the nut, the fitting will tend to tighten as a right-hand threaded pipe is mounted into the fitting. Lugs are formed on the head of the bolt portion of the fitting to assure improved retention.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a sectional view through the fitting of this inventiton mounted in a tank;

FIG. 2 is a side elevational view of the invention; and

FIG. 3 is a side elevational view taken from the opposite side.

DESCRIPTION OF THE PREFERRED EMBODIMENT

FIG. 1 illustrates the molded fitting of this invention assembled in the wall 11 of a tank 10 which is formed with an opening 12. The male portion of the fitting is designated generally as 13 and is formed with a flange 14 which has a pair of extending lugs 16 and 17 as best shown in FIG. 2. The flange 14 is also formed with a hexagonal opening 18 to allow the male portion 13 to be held during installation. An extending portion 19 of the male member 13 extends through the opening 12 when in the assembled position and is formed with internal threads 21 so as to receive a threaded pipe, not shown.

The extending portion 19 is also externally threaded with left-handed threads 22 for receiving a nut member 23 thereon. The nut member 23 is formed with internal left-handed threads 24.

In use, a washer 26 of flexible material is placed over the extending portiton 19 of the male member 13 and the male member is inserted through the opening 12 of the wall 11 of the tank. A washer 27 of polyethylene or other suitable material is placed over the extending portion 19 against the flexible grommet 26 and the nut 23 is threaded onto the threaded portion 22 of the extending portion 19 of the male member 13. A suitable wrench may be inserted into the hexagonal opening 18 to hold the male member 13 as the nut 23 is tightened on the male member 13. As the nut 23 is tightened the grommet 26 is expanded due to compression forces and provides a fluidtight seal in the opening 12. It is to be particularly noted that the grommet 26 extends axially and seals the hole 12 on its internal surface.

It is to be noted that lugs 16 and 17 extend beyond the confines of the opening 12 so that the fitting cannot be pushed through the opening 12.

A pipe, not shown, may be threadedly received in the male portion 13 after the fitting has been installed and it is to be particularly noted that right-handed pipe threads will cause the left-handed nut 23 to tighten on the male fitting 13 as the pipe is threaded into the male portion. Thus, the fitting tends to tighten as the pipe is threaded into the fitting. This assures maximum sealing efficiency of the threaded joint.

As the rubber grommet 26 seals by expanding outwardly against the side wall of the opening 12 in the tank it is not necessary that a close fit exists between the wall of the tank and the flat surfaces of the nut 23 and the flange 14. Finishing of these surfaces is not required nor of the inside of the tank.

The two lugs 16 and 17 protrude beyond the rubber grommet 26 and assure better retention of the fitting under pressure loads and in the unusual circumstances when the rubber grommet deteriorates by aggressive chemical solutions.

The nut and bolt may be formed of a suitable plastic by molding and portions may be left hollow to reduce the amount of plastic in these parts. The depressions 28 and 29 are for this purpose, for example. This allows the shrinkage of the plastic to be controlled so that the thread tolerances can be more easily maintained.

Although minor modifications might be suggested by those versed in the art, it should be understood that I wish to embody within the scope of the patent warranted hereon all such modifications as reasonably and properly come within the scope of my contribution to the art.

I claim as my invention:

1. A fitting for sealing an opening formed in a wall comprising,
    a male member formed with a flange and an extending threaded portion receivable through said opening,
    a flexible grommet receivable over the extending portion within said opening,
    a plastic washer received over the extending portion,
    a nut receivable on the extending threaded portion to compress said flexible grommet within said opening to form a fluid seal between the walls of said opening and the extending portion of said male member,
    said male member formed with a flange which is larger than as said opening in the wall and a pair of lugs formed on opposite side of said flange which extend outwardly beyond the edge of said opening, an aperture extending through said flange and an internally threaded bore forming a coaxial, fluid-conducting passageway through said male member, said aperture being of a different diameter than said bore and forming a shoulder at the juncture of the aperture and the bore, said aperture being shaped to receive and engage a holding tool therein to prevent said male member from turning as said nut is tightened, said shoulder preventing damage to the internal threads in said bore by an inserted tool, the threads of said bore and the threads of said extending portion upon which said nut is receivable formed in opposite directions so that upon the engagement of a threaded member into said internally threaded opening and torque being applied in the first direction to tighten the member relative to the threads in said internal opening the nut will tend to be tightened on the extending portion to assure that a seal is maintained.

2. A fitting according to claim 1 where the threads of said internal bore are right-handed threads, the threads of said extending portion are left-handed threads, and said nut is formed with left-handed threads.

References Cited

UNITED STATES PATENTS

| | | | |
|---|---|---|---|
| 1,513,516 | 10/1924 | McCabe et al. | 285—207 X |
| 1,863,360 | 6/1932 | Weatherhead | 285—206 X |
| 2,835,305 | 5/1958 | Boyer | 285—206 X |
| 2,999,701 | 9/1961 | Blair et al. | 285—354 X |
| 3,177,014 | 4/1965 | Bergstrom | 285—206 |

DAVID J. WILLIAMOWSKY, Primary Examiner

W. L. SHEDD, Assistant Examiner

U.S. Cl. X.R.

285—206

UNITED STATES PATENT OFFICE
CERTIFICATE OF CORRECTION

Patent No. 3,531,142            Dated September 29, 1970

Inventor(s) JOHN A. PEASLEY

It is certified that error appears in the above-identified patent and that said Letters Patent are hereby corrected as shown below:

Col. 1, line 57, "ventiton" should read --vention--;

Col. 2, line 8, "portiton" should read --portion--;

Col. 2, line 69, after "is" insert --not--;

Col. 2, line 70, delete "as".

SIGNED AND
SEALED
JAN 5 1971

(SEAL)
Attest:

Edward M. Fletcher, Jr.
Attesting Officer

WILLIAM E. SCHUYLER, JR.
Commissioner of Patents